United States Patent [19]

Detloff, Jr.

[11] 4,232,538

[45] Nov. 11, 1980

[54] CONTROL MECHANISM FOR A VEHICLE IGNITION LOCK

[75] Inventor: John C. Detloff, Jr., Saginaw, Mich.

[73] Assignee: General Motors Corporation, Detroit, Mich.

[21] Appl. No.: 24,169

[22] Filed: Mar. 26, 1979

[51] Int. Cl.³ .................. B60K 20/00; B60R 25/00; G05G 9/00; G05G 9/12

[52] U.S. Cl. .................. 70/239; 70/248; 70/251; 70/252; 74/473 R; 74/483 K

[58] Field of Search .............. 70/239, 248, 251, 252, 70/255; 74/484, 473 R, 483 K

[56] References Cited

U.S. PATENT DOCUMENTS

| | | | |
|---|---|---|---|
| 2,147,613 | 2/1939 | Sandberg | 70/254 X |
| 3,490,255 | 1/1970 | Wight et al. | 70/239 X |
| 3,550,551 | 12/1970 | Miller | 74/484 X |
| 3,646,828 | 3/1972 | Milton et al. | 74/484 |
| 3,703,092 | 11/1972 | Elliott | 70/248 |
| 3,765,262 | 10/1973 | Mendenhall et al. | 70/239 X |
| 4,029,168 | 6/1977 | Kramer | 70/252 X |
| 4,096,717 | 6/1978 | Cymbal | 70/248 |

Primary Examiner—Roy D. Frazier
Assistant Examiner—Carl F. Pietruszka
Attorney, Agent, or Firm—Donald F. Scherer

[57] ABSTRACT

A mechanical structure for controlling the available linear movement of a vehicle ignition lock mechanism has a tube member coaxial with the vehicle steering column. The tube member has an opening in which is disposed a pin which moves linearly when the ignition lock mechanism is manually operated. The tube is rotated when the vehicle transmission selector is moved whereby the pin has more or less linear travel available in the opening so that the ignition lock mechanism can be moved to the "Start" position when the transmission selector is in "Park" or "Neutral" and to the "Lock" position only when the transmission selector is in "Park".

2 Claims, 3 Drawing Figures

CONTROL MECHANISM FOR A VEHICLE IGNITION LOCK

This invention relates to position control mechanisms and more particularly to mechanical structures for controlling the movement available to a vehicle ignition lock mechanism.

It is an object of this invention to provide an improved control mechanism for a vehicle ignition lock mechanism wherein the ignition lock mechanism can be operated to start the vehicle engine when the transmission selector is in "Neutral" or "Park" and can be operated to lock the vehicle ignition when the transmission selector is in "Park".

It is another object of this invention to provide an improved mechanical control mechanism for a vehicle ignition lock mechanism wherein a tubular member responsive to vehicle transmission selection is disposed coaxial with the vehicle steering column and has formed therein an opening in which a pin member movable linearly in response to operation of the vehicle ignition mechanism prevents starting the vehicle engine unless the transmission selector is in "Neutral" or "Park" and also prevents locking the vehicle ignition unless the transmission is in "Park".

These and other objects and advantages of the present invention will be more apparent from the following description and drawings in which.

Figure 1:
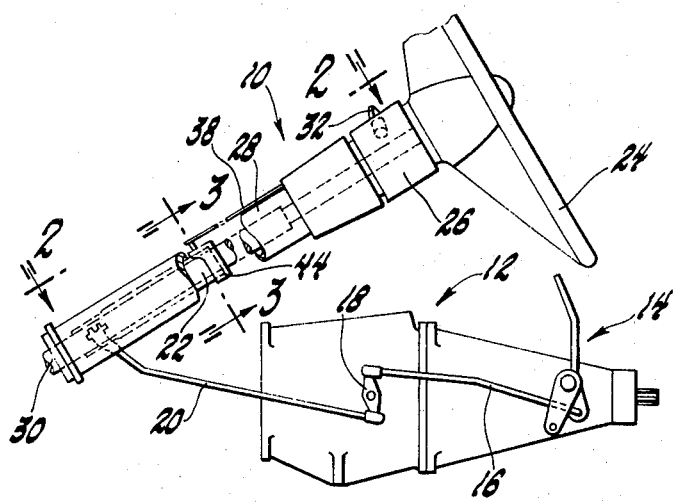
FIG. 1 is a diagrammatic view of a vehicle steering column and transmission.
Figure 3:
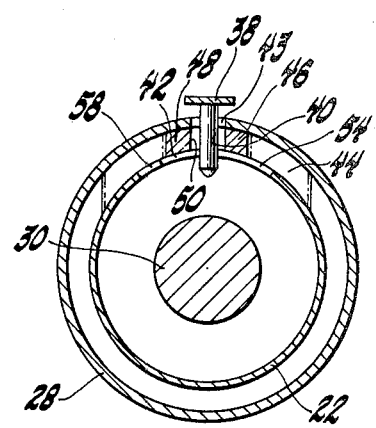
FIG. 3 is a cross-sectional view of the vehicle steering column taken along line 3—3 of FIG. 1.

Referring to the drawings, wherein like characters represent the same or corresponding parts throughout the several views, there is seen in FIG. 1 a vehicle steering column generally designated 10 and a vehicle transmission generally designated 12. The transmission 12 is controlled by a floor mounted shift control mechanism generally designated 14 which includes a link 16 connected to the conventional transmission shift quadrant or rooster comb through a lever 18 and a link 20 which is connected to a shift tube 22 which is coaxial with the steering column 10. The steering column 10 includes a steering wheel 24, an upper ignition lock housing member 26, a mast jacket 28 and a steering shaft 30. The housing member 26 encloses an ignition lock mechanism 32.

Figure 2:
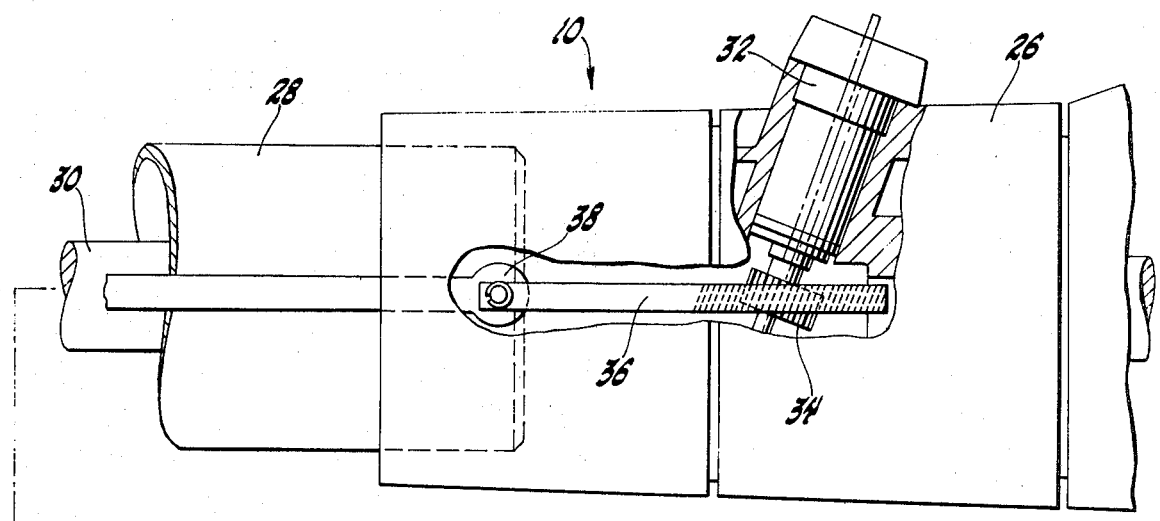
FIG. 2 is a partial view of the vehicle steering column taken along line 2—2 of FIG. 1.
Figure 2:
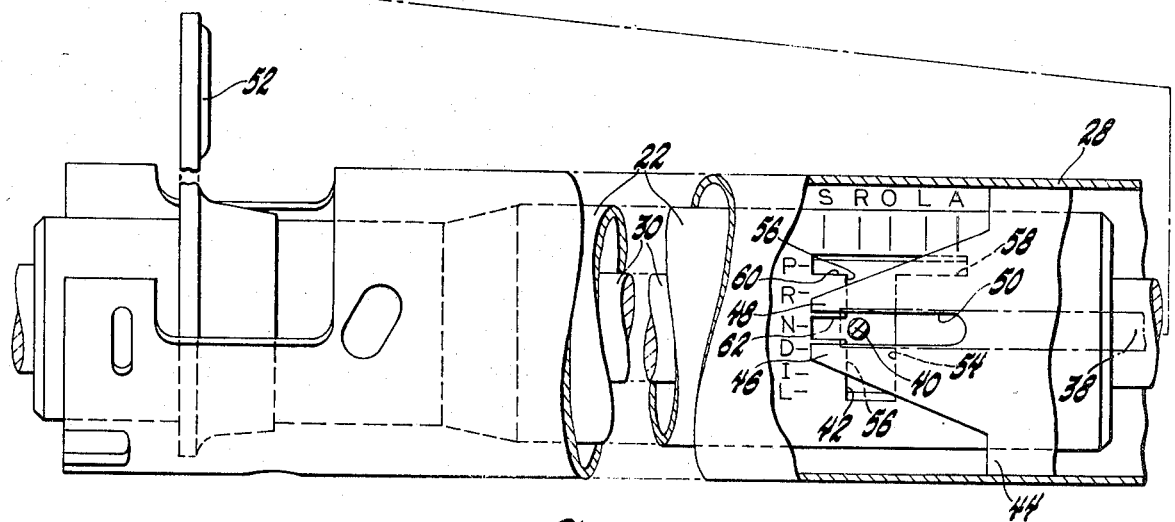

As seen in FIG. 2, the ignition lock mechanism 32 includes a sector gear 34 and a rack gear 36. The ignition lock mechanism 32 including sector gear 34 and rack gear 36 may be constructed in accordance with the teachings of U.S. Pat. Nos. to Kimberlin et al 3,590,613 issued July 6, 1971, or to Kimberlin et al 3,572,067 issued Mar. 23, 1971. The rack 36 is guided for linear movement as shown in the above-mentioned United States patents and has connected at one end thereof, a link member 38 which is disposed substantially parallel to the axis of the steering column 10. The link member 38 has a pin 40 secured adjacent one end which pin extends radially inward, relative to the steering column 10, through a radial opening 42 formed in the shift tube 22 and an axial opening 43 formed in the mast jacket 28.

The shift tube 22 is rotatably supported in the mast jacket 28 by a bearing member 44 which also has an axially extending pair of arms 46 and 48 between which the pin 40 is disposed for linear movement in a slot 50 formed by the arms 46 and 48. The shift tube 22 has secured thereto a shift lever 52 which is connected to the link 20 such that upon manipulation of the floor mounted transmission control 14 the shift tube 22 will be rotated through limited arcuate movement relative to the mast jacket 28.

The opening 42 has spaced control surfaces 54 and 56 which extend circumferentially relative to the shift tube 22. As seen in FIG. 2, the control surface 54 terminates at an axially extending slot 58 and the control surface 56 terminates at an axially extending slot 60. These slots 58 and 60 extend in opposite axial directions along the shift tube 22. The control surface 56 is interrupted between its terminal ends by a slot 62 which extends parallel to and in the same axial direction as slot 60.

When the ignition lock mechanism 32 is operated by the vehicle operator, the conventional rotary input motion thereto is converted to linear motion in the link 38. The ignition lock mechanism 32 can be moved to the conventional positions "Start" (S), "Run" (R), "Off" (O), "Lock" (L) and "Accessory" (A). These positions are designated for discussion purposes along the steering column in FIG. 2 and indicate the position of the pin 40 in each mode. The transmission mechanism and therefore shift tube 22, can be moved to the convention positions such as "Park" (P), "Reverse" (R), "Neutral" (N), and forward drive ranges "Drive" (D), "Intermediate" (I) and "Low" (L). These positions are indicated also in FIG. 2 to permit discussion of the operation of this mechanism. The ignition lock mechanism is shown in FIG. 2 to be in the "Run" position and the transmission is in "Neutral" position. This would be the normal operating condition if the vehicle was placed in "Neutral" and with the engine running. At this time, the ignition can be moved to the "Off" position thereby stopping the engine. If the engine is stopped, the ignition lock mechanism can be moved to the "Start" position at which time the pin 40 will extend into the axial slot 62 and the engine can be started. If the transmission selector is moved to "Reverse", "Drive", "Intermediate" or "Low", the ignition lock mechanism through pin 40 has only limited movement between the control surfaces 56 and 54. Between these control surfaces 56 and 54, the ignition lock mechanism can only be moved to the "Run" and "Off" positions such that if the engine is stopped, it cannot be restarted. If the transmission selector is in the "Park" position, axial slots 58 and 60 will be aligned with pin 40 so that the ignition lock mechanism can be moved to all of its operating conditions. It is only when the transmission is in "Park" that the ignition lock mechanism can be moved to the "Lock" position.

As is well known in many vehicle ignition systems, the operator's key cannot be removed from the lock cylinder until the cylinder is locked. Therefore, with the present system, the transmission would have to be in "Park" before the ignition could be locked and the ignition key removed. From the above description, it should be apparent that the vehicle can be started only when the transmission is in "Neutral" or "Park" thus preventing a start-up of the vehicle engine when the transmission is selected for forward or reverse drive.

With the present invention, it is possible to place the electrical switch functions on either the mast jacket where they can be energized by the pin 40 or the electrical switch functions can be built into the rotary member of the ignition mechanism 32. The opening 42 will satisfy the neutral start requirement which is presently controlled by an electrical switch function located on either the mast jacket or the transmission housing.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A position control mechanism for use in a vehicle having a steering column, a steering column mounted ignition lock mechanism movable by the operator to "Start", "Run", "Off" and "Lock" positions, and a floor mounted transmission control mechanism, said position control mechanism comprising; a tubular member concentric with the axis of the steering column and being rotatable about the axis by the transmission control mechanism; an opening in said tubular member having circumferentially extending axially spaced parallel control surfaces, axially aligned end slots extending axially from one end of said control surfaces, and another slot extending axially from only one of said control surfaces intermediate the ends of the one said control surface; and pin means operatively connected with the ignition lock mechanism and limited in axial movement by said opening, whereby said ignition lock mechanism is movable to all of its positions only when said pin means is axially aligned with said end slots, is movable to said "Start", "Run" and "Off" positions when said pin means is axially aligned with said another slot, and is freely movable between said control surfaces to said "Off" and "Run" positions regardless of the axial relationship of said opening relative to said pin means.

2. A position control mechanism for use in a vehicle having a steering column, a steering column mounted ignition lock mechanism movable by the operator to "Lock", "Off", "Run" and "Start" positions, and a floor mounted transmission control mechanism, said position control mechanism comprising; a tubular member concentric with the axis of the steering column and being rotatable about the axis by the transmission control mechanism; an opening in said tubular member having first and second circumferentially extending axially spaced parallel control surfaces, a "Lock" slot extending axially from said first control surface, a first "Start" slot extending axially from said second control surface and being axially aligned with the "Lock" slot, and a second "Start" slot extending axially from said second control surface at a location spaced circumferentially from the first "Start" slot; an elongated member disposed axially relative to said tubular member, said elongated member being operatively connected with and longitudinally movable by the ignition lock mechanism, a pin member secured perpendicular to said elongated member and being disposed in said opening whereby said ignition lock mechanism is movable to said "Lock" position only when said pin member is axially aligned with said "Lock" slot, is movable to said "Start" position only when said pin member is axially aligned with one of said first and second "Start" slots, and is freely movable between said first and second control surfaces to said "Off" and "Run" positions regardless of the axial relationship of said opening relative to said pin member.

* * * * *